(12) United States Patent
Cvoric et al.

(10) Patent No.: US 10,785,844 B2
(45) Date of Patent: Sep. 22, 2020

(54) RETROFIT LED TUBE FOR CONNECTING TO AN ELECTRONIC BALLAST, AND A CORRESPONDING LIGHTING SYSTEM AND METHOD

(71) Applicant: SIGNIFY HOLDING B.V., Eindhoven (NL)

(72) Inventors: Dalibor Cvoric, Arnhem (NL); Yi Wang, Delft (NL); Haimin Tao, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/470,272

(22) PCT Filed: Dec. 11, 2017

(86) PCT No.: PCT/EP2017/082250
§ 371 (c)(1),
(2) Date: Jun. 17, 2019

(87) PCT Pub. No.: WO2018/108826
PCT Pub. Date: Jun. 21, 2018

(65) Prior Publication Data
US 2020/0015329 A1 Jan. 9, 2020

(30) Foreign Application Priority Data
Dec. 16, 2016 (EP) ..................................... 16204591

(51) Int. Cl.
*H05B 45/50* (2020.01)
*H05B 45/40* (2020.01)

(52) U.S. Cl.
CPC ............. *H05B 45/50* (2020.01); *H05B 45/40* (2020.01)

(58) Field of Classification Search
None
See application file for complete search history.

(56) References Cited

U.S. PATENT DOCUMENTS 10,136,486 B2 * 11/2018 Segers ............... H05B 33/0809
2014/0125253 A1   5/2014 Chen et al.
(Continued)

FOREIGN PATENT DOCUMENTS

CN      203590539 U    5/2014
CN      104595762      5/2015
(Continued)

*Primary Examiner* — Dedei K Hammond
(74) *Attorney, Agent, or Firm* — Patrick T. Driscoll (57) ABSTRACT

A retrofit LED tube for connection to an electronic ballast, said retrofit LED tube comprising an LED array for emitting light, an alternating current, AC, LED driver arranged for receiving an AC supply voltage and for driving said LED array based on said received AC supply voltage, a filament circuit for supporting a filament current circulating back to said electronic ballast for enabling lamp recognition by said electronic ballast during a lamp recognition phase, and a lamp current to said AC LED driver for driving said LED array during a steady-state phase, and comprising a filament enhancement circuit arranged to reduce at least one of said filament current and said lamp current flowing through said filament circuit, during said steady-state phase.

13 Claims, 4 Drawing Sheets

(56) References Cited

U.S. PATENT DOCUMENTS

| | | |
|---|---|---|
| 2014/0225519 A1 | 8/2014 | Yu et al. |
| 2014/0239834 A1 | 8/2014 | Choi et al. |
| 2016/0081147 A1 | 3/2016 | Guang |

FOREIGN PATENT DOCUMENTS

| | | | |
|---|---|---|---|
| DE | 202013000880 U1 | 4/2013 | |
| EP | 2076095 B1 | 10/2013 | |
| EP | 3240367 A1 * | 11/2017 | ......... H05B 33/0824 |
| WO | 2015074917 A1 | 5/2015 | |
| WO | 2016124477 A1 | 8/2016 | |
| WO | 2016146405 A1 | 9/2016 | |

* cited by examiner

Fig. 4

RETROFIT LED TUBE FOR CONNECTING TO AN ELECTRONIC BALLAST, AND A CORRESPONDING LIGHTING SYSTEM AND METHOD

CROSS-REFERENCE TO PRIOR APPLICATIONS

This application is the U.S. National Phase application under 35 U.S.C. § 371 of International Application No. PCT/EP2017/082250, filed on Dec. 11, 2017, which claims the benefit of European Patent Application No. 16204591.8, filed on Dec. 16, 2016. These applications are hereby incorporated by reference herein.

FIELD OF THE INVENTION

The present invention generally relates to the field of lighting and, more specifically, to a retrofit Light Emitting Diode, LED, tube. The present invention further relates to a lighting system comprising a high frequency electronic ballast and the retrofit LED tube, and to a method of operating a retrofit LED tube.

BACKGROUND OF THE INVENTION

Lighting devices have been developed that make use of Light Emitting Diodes, LED's, for a variety of lighting applications. Owing to their long lifetime and high energy efficiency, LED lamps are nowadays also designed for replacing traditional fluorescent lamps, i.e. for retrofit applications. For such an application, a retrofit LED tube is typically adapted to fit into the socket of the respective lamp fixture to be retrofitted. Moreover, since the maintenance of a lamp is typically conducted by a user, the retrofit LED tube should ideally be readily operational with any type of suitable fixture without the need for re-wiring the fixture.

Such a retrofit LED tube is, for example, disclosed in US 2016/0081147. Here, a LED tube is wired to receive the current that is input from any two electrode pins from among the pairs of pins at the ends of the tube, which house the driver circuitry. The input current is converted to DC through a rectifier circuit, is filtered of unwanted frequencies and voltage through a filter circuit, and is controlled with a step-down constant current circuit to drive an LED array within the tube.

One of the challenges for these known retrofit LED tubes is to reduce the power consumption. Even though the power consumed by a retrofit LED tube is typically much less compared to conventional fluorescent tubes, it is desired to provide for a retrofit LED tube that reduces the power consumption even more, without affecting the total light emitted by the retrofit LED tube.

US 2014/0125253 discloses a device and method to interface with a magnetic or electronic fluorescent ballast; evaluate, process, and regulate the incoming power from the ballast device and output a steady AC power that can be used by LED drivers, LED chips, or set of multiple LED chips in a tube or bulb application. This device and method will allow for a non-fluorescent replacement lighting device such as a LED lighting tube or bulb to be used in a fluorescent light luminaire without any electrical wiring modification or removal of the electronic or magnetic ballast.

SUMMARY OF THE INVENTION

It would be advantageous to achieve a retrofit Light Emitting Diode, LED, tube for a fluorescent tube that reduces the amount of power consumed, without affecting the total light emitted by the retrofit LED tube. It would further be advantageous to achieve a corresponding lighting system as well as a corresponding method of operating a retrofit LED tube.

To better address one or more of these concerns, in a first aspect of the present disclosure, there is presented a retrofit Light Emitting Diode, LED tube for connection to an electronic ballast, said retrofit LED tube comprising:
- an LED array for emitting light;
- an alternating current, AC, LED driver arranged for receiving an AC supply voltage and for driving said LED array based on said received AC supply voltage;
- a filament circuit for supporting:
  - a filament current circulating back to said electronic ballast for enabling lamp recognition by said electronic ballast during a lamp recognition phase, and
  - a lamp current to said AC LED driver for driving said LED array during a steady-state phase;
- a filament enhancement circuit arranged to reduce power consumed by said filament circuit, wherein said reduced power corresponds to at least one of said filament current and said lamp current flowing through said filament circuit, during said steady-state phase.

It was the insight of the inventors that the power consumed by the filament circuit can be reduced after the lamp recognition phase as, after that phase, the filament circuit is typically no longer needed to provide for the filament current to the ballast.

In other words, the filament circuit is typically used to avoid that the ballast goes into a protection mode. Such a fault detection mode, or lamp recognition mode, of the ballast is active during the start-up of the retrofit LED tube, i.e. during a lamp recognition phase. After the lamp recognition phase, i.e. during the steady-state phase, the filament does typically not serve a useful purpose. As such, the power dissipated by the filament circuit, after the lamp recognition phase, can be reduced by reducing the current flowing through the filament circuit.

The inventors have introduced a filament enhancement circuit which is arranged to reduce the power consumed by the filament circuit corresponding to at least one of the filament current and the lamp current flowing through the filament circuit after the lamp recognition phase.

Following the above, it was noted that the filaments are needed to mimic a fluorescent tube towards the ballast. Once the ballast has determined, i.e. recognized, the lamp, i.e. mimicked lamp, the filament circuit can be disabled, circumvented or bypassed using the filament enhancement circuit.

Another advantage the proposed retrofit LED tube has over known retrofit LED tubes is related to the size of the components. In a simplified manner, the current through the filament circuit is composed of the filament current and the lamp current. The filament current is provided by the ballast, flows through the filament circuit and then returns to the ballast. The lamp current flows through the filament circuit, to the AC LED driver and the LED array before returning to the ballast. Typically, the lamp current is much higher compared to the filament current.

In a conventional retrofit LED tube, the lamp current flows through the filament circuit. This requires that large resistors, for example power resistors, are to be used in the filament circuit to cope with the lamp current. The filament enhancement circuit according to the present disclosure can be used to reduce any current flowing through the filament circuit such that no power resistors are required in the filament circuit. It is noted that this does not mean that the total lamp current is reduced as that would reduce the total amount of emitted light. The enhancement circuit can, for example, make sure that the same lamp current is still provided to the AC LED driver, but that the lamp current does not flow through the filament circuit. That is, the filament circuit is in this case circumvented/bypassed.

According to the present disclosure two phases of the retrofit LED tube are identified, i.e. a lamp recognition phase and a steady state phase. It is noted that these phases do not necessary need to be consecutive to one each other. The lamp recognition phase is used, by the ballast, to recognize the (type of) lamp that is connected to the ballast. Such a phase typically requires a very small amount of time. The ballast may initiate the steady state phase once the lamp recognition phase is completed, or once the ballast has detected the type of lamp, or during the lamp recognition phase. The ballast will provide the lamp current during the steady state phase. The lamp current is thus used by the LEDs of the LED array to emit light.

In accordance with the present disclosure, an LED tube is retrofitted in case it fits in conventional armatures for fluorescent tubes, for example fluorescent tubes suitable for T5, T12 or anything alike. In order to fit in these conventional armatures, the retrofit LED tube comprises conducting pens for connecting, and supporting, the retrofit LED tube in the conventional armatures.

In an embodiment, the filament enhancement circuit comprises:
 at least one bypass switch arranged for enabling a bypass path for bypassing said filament circuit;
 a controller arranged for activating said at least one bypass switch after said lamp recognition phase.

The advantage of this embodiment is that the filament circuit is completely bypassed once the recognition phase has completed, or during the steady state phase. This has the effect that the lamp current does not flow through the filament circuit. As such, any power dissipation occurring in the filament circuit, due to the lamp current, is circumvented.

The bypass path is basically a low resistive path in parallel to the filament circuit which short circuits the filament circuit. The result is that the lamp current will not flow through the relatively high ohmic filament circuit but will flow through the relatively low ohmic bypass path.

In this particular embodiment, the filament enhancement circuit is thus arranged to reduce the lamp current flowing through the filament circuit by creating a bypass path for the lamp current for bypassing the filament circuit. Again, the total amount of lamp current is not reduced. The path which is created for the lamp current is changed such that the lamp current no longer flows through the filament circuit. This reduces the amount of power consumed by the filament circuit corresponding to the lamp current.

The controller may be any type of hardware such as a microprocessor, a micro controller, a Field Programmable Gate Array, FPGA, or anything alike. The control unit may be empowered via the AC supply voltage or may be empowered using an auxiliary power supply such as a battery.

The bypass switch may comprise a Metal Oxide Semiconductor, MOS, Field Effect Transistor, FET placed in parallel to the filament circuit.

In another embodiment, the filament enhancement circuit comprises:
 a thermistor connected in parallel to said filament circuit, wherein said thermistor provides a bypass path for bypassing said filament circuit.

A thermistor is a type of resistor of which the resistance thereof depends on the temperature of the resistor. Two types of thermistors currently exist. A Negative Temperature Coefficient, NTC, resistor is a resistor in which the resistance decreases as the temperature rises. Such a resistor is typically used to protect against inrush overvoltage conditions. A Positive Temperature Coefficient, PTC, resistor is a resistor in which the resistance increases as the temperature rises. Such a resistor is typically used to protect against overcurrent conditions.

In accordance with the present disclosure, an NTC resistor can be placed in parallel to the filament circuit for providing the bypass path. The temperature of the components present in the filament circuit, more specifically the resistors present in the filament circuit, will increase once the lamp current starts to flow through the filament circuit. As a result, also the temperature of the NTC resistor will increase which will cause the resistance thereof to decrease. This has the effect that an increased amount of the lamp current will flow through the NTC resistor, thereby heating the NTC resistor even more. As such, the resistance of the NTC resistor will drop even further. End result is that the lamp current flowing through the filament circuit is reduced, as a large part of the lamp current will flow through the NTC resistor. It is noted that the total amount of lamp current is, preferably, not reduced. As such, only the current flowing though the filament circuit is reduced such as to lower the total power consumption of the filament circuit.

In a further embodiment, the filament enhancement circuit comprises:
 a filament switch connected in series with said filament circuit;
 a controller arranged for deactivating said filament switch after said lamp recognition phase.

It is noted that the retrofit LED tube is typically connected to the ballast using four different pins. The first two pins are provided at one end face of the tube, and the third and fourth pin are provided at the other end face of the tube. A first filament circuit is provided between the first two pins, and a second filament is provided between the third and the fourth pin. The lamp current flows from the first two pins to the third/fourth pin, or vice versa. The filament current of the first filament circuit flows from the first pin to the second pin, or vice versa. The filament current of the second filament circuit flows from the third pin to the fourth pin, or vice versa.

In accordance with the present embodiment, a filament switch may be placed between the first and the second pin. The lamp current may then flow from one of the two pins, for example the first pin, directly to the AC LED driver. The filament current is then interrupted, suspended, by deactivating the filament switch. This would make sure that the filament circuit does not connect the first pin to the second pin. As such, during the steady state phase, i.e. after the lamp recognition phase, the resistors of the filament circuit do not dissipate power with respect to the filament current as the filament current is no longer flowing. The resistors of the filament circuit also do not dissipate power with respect to the lamp current as the lamp current does not flow through the filament circuit in this particular situation.

In a further embodiment, the filament circuit comprises two resistors connected in series, and wherein said filament enhancement circuit comprises one bypass switch connected in parallel to both of said two resistors.

In another embodiment, the filament circuit comprises two resistors connected in series, and wherein said filament enhancement circuit comprises two bypass switches, wherein said two bypass switches are connected in parallel over said two resistors, respectively.

In this particular situation, the output of the filament circuit is typically connected in between the two resistors connected in series. The lamp current typically flows through one of the resistors towards the output. This current may be detected, and, based on the detection, the corresponding switch may be activated such that that resistor is bypassed during the steady-state phase.

As an alternative, the lamp current does not flow through the resistors. Here, the output of the filament circuit is directly connected to one of the pins for connecting to the electronic ballast. As such, the switches over the resistors have no effect on the lamp current. By activating the switch, however, the filament current can be reduced which also reduces the total amount of power dissipated by the filament circuit.

In a further embodiment, the filament enhancement circuit further comprises a shunt resistor connected in series with said bypass switch.

The advantage of this example is that, due to the shunt resistor, the amount of inrush current can be reduced.

In another embodiment, the switch is a Metal Oxide Semiconductor, MOS, Field Effect Transistor, FET.

In a further embodiment, the filament enhancement circuit is arranged to determine that said lamp recognition phase is completed by any of:
    detecting a lamp current flowing to said LED array;
    determining that a predefined amount of time has lapsed since said AC supply voltage was received.

It was one of the insights that, in order to make the retrofit LED tube even more compatible, logic can be introduced in the filament enhancement circuit for determining whether the steady-state phase has initiated and/or whether the lamp recognition phase has completed. Based on this particular detection, the switches placed in parallel over the resistors of the filament circuit may be activated, or not.

In a second aspect of the present disclosure, there is provided a lighting system, comprising:
    a high frequency electronic ballast, and
    a retrofit LED tube according to any of the claims 1-9,
        wherein the retrofit LED tube is connected to said high frequency electronic ballast.

It is noted that the advantages and definitions as disclosed with respect to the embodiments of the first aspect of the invention, being the retrofit LED tube, also correspond to the embodiments of the second aspect of the invention, being the lighting system, respectively.

Electronic ballasts may regulate the electric flow inside the lamp through electronic circuitry. The electronic ballast, sometimes also referred to as control gear, is typically arranged to limit the current which flows in an electric circuit such that the current is basically kept at a level that prevents the lamp from burning out. These type of ballasts may operate in parallel or in a series mode. Preferably, a series mode is used because in such case, the failure of a single lamp does not disrupt the working of all other lamps. Another type of ballast is the High Frequency ballast. Such a ballast typically uses a frequency above the 20 kHz.

Another type of ballast is a magnetic ballast which employs core and coil transformers to operate lamps. These types of ballasts are arranged to control electric current and the flow at an appropriate level for the lamps. Although these types of ballasts are the simplest, they are characterized by higher robustness.

In a third aspect of the present disclosure, there is provided a method of operating a retrofit LED tube according to any of the embodiment as disclosed above, wherein said method comprises the steps of:
    determining, by said filament enhancement circuit, that said lamp recognition phase has completed;
    reducing, by said filament enhancement circuit, power consumed by said filament circuit in reply to said determination that said lamp recognition phase is completed.

It is noted that the advantages and definitions as disclosed with respect to the embodiments of the first and second aspect of the invention, being the retrofit LED tube and the lighting system, respectively, also correspond to the embodiments of the third aspect of the invention, being the method of operating a retrofit LED tube.

In an embodiment, the step of reducing said power consumed by said filament circuit comprises:
    activating, by said controller, said at least one bypass switch after lamp recognition phase.

In a further embodiment, the step of reducing said power consumed by said filament circuit comprises:
    deactivating, by said controller, said filament switch after said lamp recognition phase.

In another embodiment, the method comprises the step of determining that said lamp recognition phase is completed by any of:
    detecting, by said filament enhancement circuit, a lamp current flowing to said LED array;
    determining, by said filament enhancement circuit, that a predefined amount of time has lapsed since said AC supply voltage was received.

The method may be effectively performed by a suitably programmed processor or programmable controller, such as a microprocessor or microcontroller provided with the solid-state light source.

These and other aspects of the invention will be apparent from and elucidated with reference to the embodiment(s) described hereinafter.

DETAILED DESCRIPTION

Figure 1:
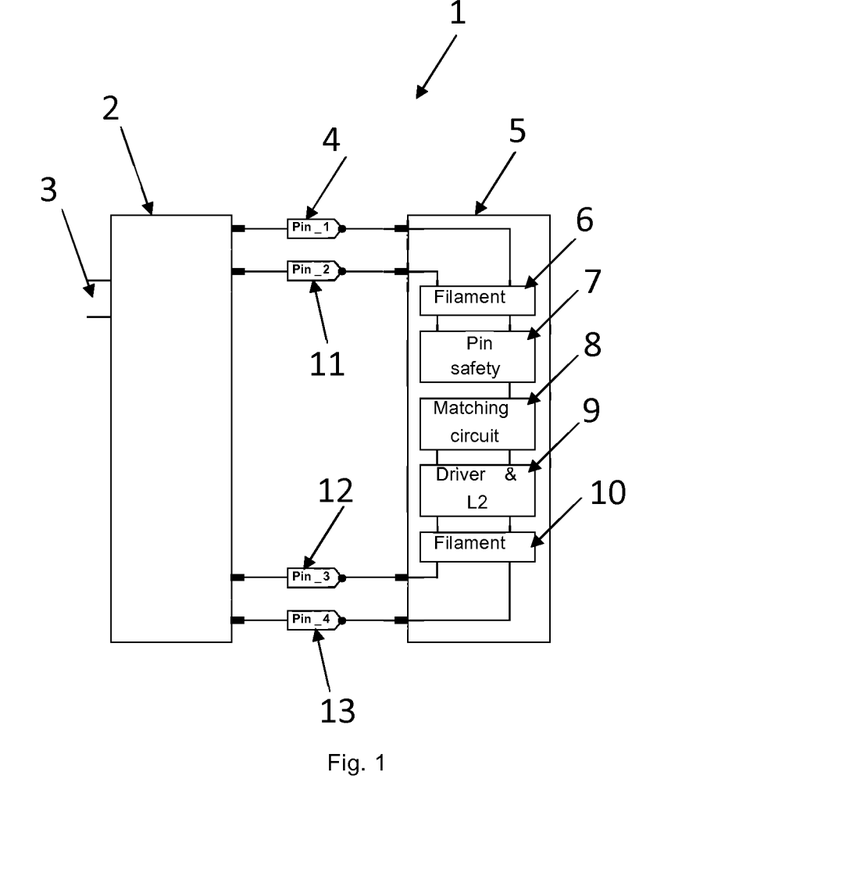
FIG. 1 shows a conventional lighting system comprising a retrofit Light Emitting Diode, LED, tube as well as a ballast.

Reference numeral 1 designates a lighting system comprising a retrofit Light Emitting Diode, LED, tube 5 as well as an electronic ballast 2. It is noted that a LED tube 5 is retrofitted in case it fits in conventional armatures for fluorescent tubes, for example fluorescent tubes suitable for T5, T12 or anything alike. In order to fit in these conventional armatures, the retrofit LED tube 5 comprises conducting pens for connecting, and supporting, the retrofit LED tube 5 in the conventional armatures. In the present situation, the electronic ballast 2 is connected to the retrofit LED tube 5 using four pins as indicated with reference numerals 4, 11, 12 and 13.

The electronic ballast 2 is connected to an Alternating Current, AC, mains power supply for supplying an AC supply voltage. The AC supply voltage is, for example, 230

Vac or 110 Vac. The electronic ballast converts the AC supply voltage to an output voltage suitable for driving a conventional fluorescent tube. In this case, the retrofit LED tube 5 should be made suitable to cope with the output of the electronic ballast 2.

The retrofit LED tube 5 comprises several components to mimic the operation of a fluorescent tube. First, the retrofit LED tube 5 comprises two filament circuits 6, 10. Each filament circuit 6, 10 is arranged to provide a filament current to the electronic ballast for enabling lamp recognition by the electronic ballast 2. For example, the filament current flows from the pin indicated with reference numeral 4 through the filament circuit indicated with reference numeral 6 back to the electronic ballast 2 via the pin indicated with reference numeral 11. The same upholds for the filament circuit indicated with reference numeral 10.

A pin safety circuit 7 is provided for providing several safety aspects. This pin safety circuit 7 is not explained in detail in this disclosure. A skilled person in the art is well aware of the functioning of such a circuit 7 in retrofit LED tubes.

Further, an Alternating Current, AC, LED driver 9 is provided which is arranged for receiving an AC supply voltage and for driving an LED array based on the received AC supply voltage.

The retrofit LED tube comprises the LED array, also referred to as an LED load, for emitting light. The LED array may comprise a plurality of series and parallel connected LED's. Those skilled in the art will appreciate that in practical embodiments the LEDs are evenly distributed and spaced apart across the length of the tube, to provide for an as evenly as possible lighting by the LED tube over its entire length. The present disclosure is not limited to any specific type of LED, nor to any colour LEDs. Typically, white coloured LEDs are used.

The present example is discussed with respect to an AC supply voltage of 230V, but may also operate in different kinds of AC supply voltages. Further, the present example is not limited to the specific rectifier or AC LED driver as shown in FIG. 1. A skilled person is well aware of different types of implementations for the AC LED driver which are also suitable for empowering the LED's in the LED array.

Figure 2:
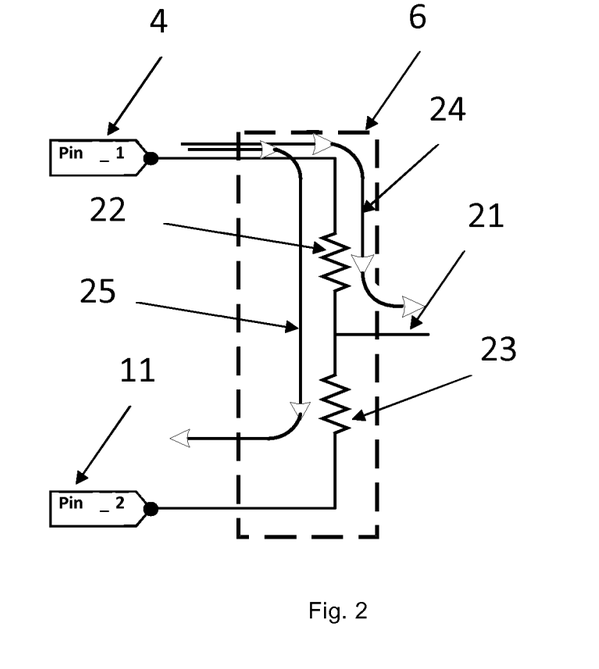
FIG. 2 shows a filament circuit provided in a retrofit LED tube according to the present disclosure.

FIG. 2 shows a filament circuit 6 provided in a retrofit LED tube according to the present disclosure.

Here, the filament circuit 6 is connected to the electronic ballast via the pins indicated with reference numerals 4 and 11. The filament circuit 6 is a resistive circuit. In this particular situation, the circuit 6 comprises two resistors 22, 23 connected in series. Following the above, two different currents can be identified. A first current is the filament current 25 which flows from a first pin, i.e. referenced to with reference numeral 4, to the second pin, i.e. referenced to with reference numeral 11. The characteristics of the filament current 25 are used, by the electronic ballast 2, for lamp recognition. That is, the characteristics of the filament current 25 can be used, by the electronic ballast 2, to determine which type of lamp is mimicked by the retrofit LED tube. The filament current 25 will flow at least during a lamp recognition phase.

A second current is the lamp current 24, which is provided to said AC LED driver for driving said LED array during a steady-state phase. The output of the filament circuit is indicated with reference numeral 21. Normally, the lamp current 24 is much higher compared to the filament current 25.

Figure 3:
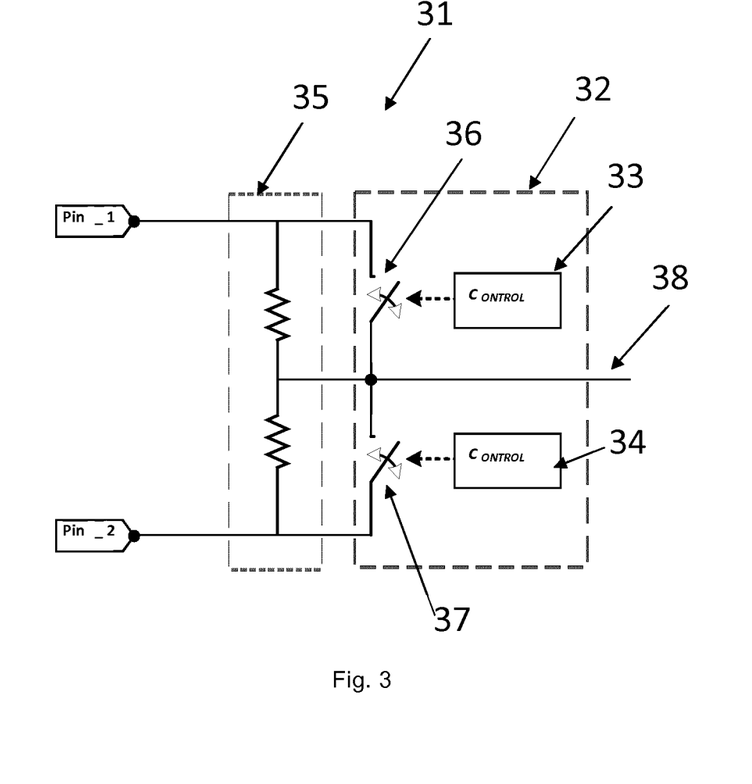
FIG. 3 shows a part of a retrofit LED tube according to an embodiment of the present disclosure.

FIG. 3 shows a part 31 of a retrofit LED tube according to an embodiment of the present disclosure.

The retrofit LED tube is used for replacing a fluorescent tube. In accordance with the present disclosure, a housing may be provided for housing the components of the retrofit LED tube. More specifically, the housing may be arranged to house each of the components shown in FIG. 1. The housing may be a light transmissive housing or a partly light transmissive housing, configured as a retrofit tube type, for example.

The housing is designed in such a way that a user is not able to get access to, i.e. touch, the electrical components present inside the housing 11. This ensures that the retrofit LED tube complies to local regulation requirements.

In FIG. 3, the filament circuit 35 is provided with a filament enhancement circuit 32. The filament enhancement circuit 32 is arranged to reduce power consumed by said filament circuit 35 corresponding to at least one of the filament current and the lamp current flowing through the filament circuit during the steady-state phase.

In the present example, the power consumed in the filament circuit is reduced due to the filament current as well as the lamp current which is explained in more detail here below.

It is noted that, during the lamp recognition phase, both switches 36 and 37 are open. In such a situation, the filament circuit 35 is not bypassed, short-circuited or anything alike. The filament current still flows from the first pin, through both resistors, to the second pin back to the electronic ballast.

Different from prior art LED tubes is that one of the switches 36, 37 is closed during the steady-state phase. For example, the switch indicated with reference numeral 36 is closed and the switch indicated with reference numeral 37 is opened. This would ensure that the lamp current, originating from the first pin, does not flow through the resistors of the filament circuit 35. The filament circuit is, in fact, bypassed as the lamp current flows through the closed switch indicated with reference numeral 36 towards the output 38. In the present example, the switches indicated with reference numerals 36, 37 are called bypass switches as they are able, if closed, to bypass the filament circuit. In case the electronic ballast also provides for a filament current during the steady-state phase, then the power consumed by the filament circuit with respect to the filament current is reduced as well. The filament current does not flow through both resistors of the filament circuit as one of the resistors is short-circuited by a corresponding switch.

The switches 36, 37 are controlled by the controllers indicated with reference numerals 33 and 34, respectively. It is noted that the controllers 33, 34 could be implemented in different components but could also be implemented in a single controller. The controllers may be any type of hardware such as microprocessors, micro controllers, Field Programmable Gate Array's, FPGAs, or anything alike.

The inventors have further found that, typically, the lamp current either originates from the first pin or from the second pin. This is decided, i.e. controlled, by the electronic ballast connected to the retrofit LED tube. As such, in the present example, two controllers 33, 34 are depicted. The switch indicated with reference numeral 36 is closed during the steady-state phase in case the lamp current originates from the first (upper) pin. The switch indicated with reference numeral 37 is closed during the steady-state phase in case the lamp current originates from the second (lower) pin.

The filament enhancement circuit 32 is, in an example, further arranged to determine, i.e. sense, whether the lamp current originates from the first pin or from the second pin. Based on this determination, the filament enhancement circuit 32 decides whether to close the switch indicated with reference numeral 36 or whether to close the switch indicated with reference numeral 37.

Following the above, the retrofit LED tube may be operated in at least two phases, i.e. a lamp recognition phase and a steady-state phase. These phases may partly overlap with each other or may be subsequent to each other. During the lamp recognition phase, the electronic ballast uses the filament current to determine which type of lamp is attached thereto. As such, the retrofit LED tube mimics a certain fluorescent lamp to the electronic ballast. Based on this determination, the electronic ballast may start providing a lamp current to the retrofit LED tube. This is when the steady-state phase starts. The lamp current is used by the retrofit LED tube to activate the LED's of the LED array.

According to the present disclosure, multiple options exist for determining that said lamp recognition phase is completed. For example, the filament enhancement circuit may detect a lamp current flowing to said LED array. In case, for example, the current at the output of the filament circuit exceeds a predetermined lamp current threshold, it may be decided that the steady-state phase has started.

In another example, the filament enhancement circuit determines that a predefined amount of time has lapsed since the AC supply was first received. That is, the filament enhancement circuit decides that the lamp recognition phase is completed once a certain amount of time has lapsed. To be on the safe side, the predefined amount of time is chosen such that it is relatively long thereby assuring that the lamp recognition phase is completed.

Figure 4:
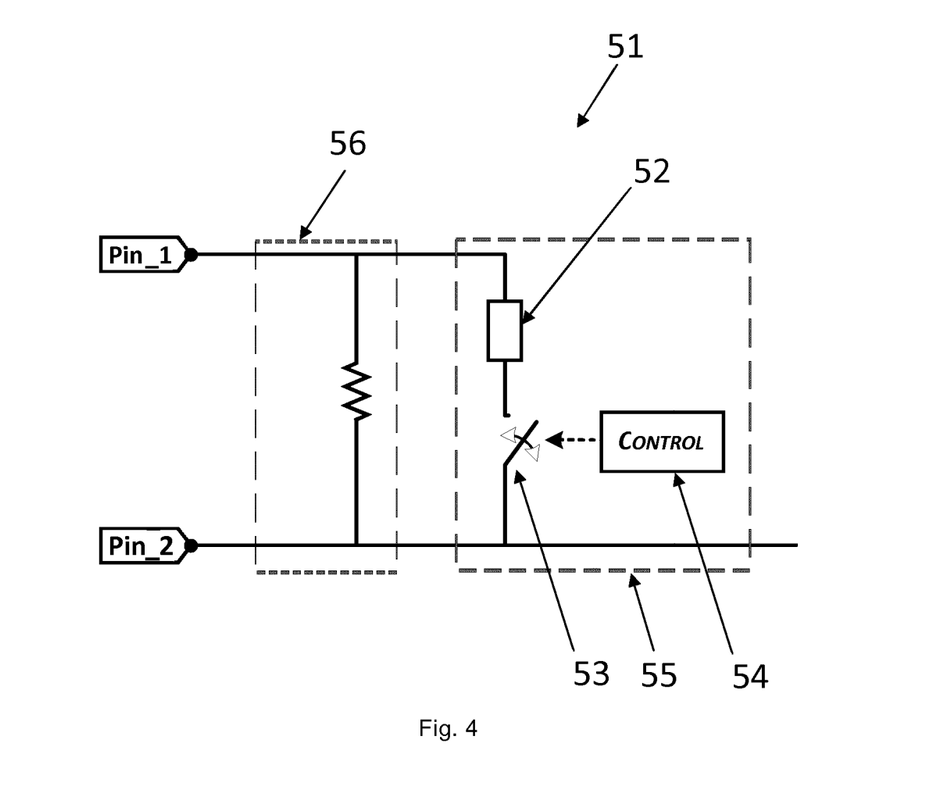
FIG. 4 shows a part of a retrofit LED tube according to another embodiment of the present disclosure.

FIG. 4 shows a part 51 of a retrofit LED tube according to another embodiment of the present disclosure.

Here, the filament enhancement circuit 55 comprises a shunt resistor 52 connected in series with a switch 53. The operation of the switch 53 is controlled by a controller 54.

During the steady-state phase, the switch 53 is activated such that a bypass circuit is generated for the filament circuit 56. The size of the shunt resistor 52 is typically chosen such that inrush current is reduced.

It is noted that, as an alternative to the embodiment shown in FIG. 4, a thermistor can be used. The thermistor is then a component which replaces at least the switch indicated with reference numeral 53. No active control is required to control the thermistor. The resistance value of the thermistor will control itself. Thermistors are thermally sensitive resistors whose prime function is to exhibit a large, predictable change in resistance when subjected to a corresponding change in temperature. Negative Temperature Coefficient thermistors exhibit a decrease in electrical resistance when subjected to an increase in temperature and Positive Temperature Coefficient thermistors exhibit an increase in electrical resistance when subjected to an increase in body temperature.

It is further noted that the electronic ballast, connected to the retrofit LED, is typically a current source. That is, a predefined amount of current is provided to the retrofit LED regardless of how much resistance is present at the retrofit LED.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A retrofit light emitting diode (LED) tube for connection to an electronic ballast, the retrofit LED tube comprising:
    an LED array for emitting light;
    an LED driver arranged for receiving a supply voltage and for driving the LED array based on the received supply voltage;
    a filament circuit configured to carry:
        a filament current circulating back to the electronic ballast for enabling lamp recognition by the electronic ballast during a lamp recognition phase, and
        a lamp current to the LED driver for driving the LED array during a steady-state phase; and
    a filament enhancement circuit comprising:
        at least one circuit element arranged for enabling a bypass path for bypassing at least a first part of the filament circuit;
        a controller arranged for activating the at least one circuit element to bypass the first part of the filament circuit after the lamp recognition phase, wherein the filament enhancement circuit is arranged to reduce power consumed by the filament circuit corresponding to at least one of the filament current and the lamp current flowing through the filament circuit during the steady-state phase.

2. A retrofit LED tube according to claim 1, wherein the filament circuit comprises two resistors connected in series, and wherein the at least one circuit element is connected in parallel to both of the two resistors and the first part of the filament circuit is both of the two resistors.

3. A retrofit LED tube according to claim 1, wherein the filament circuit comprises two resistors connected in series, and wherein the filament enhancement circuit comprises a second circuit element arranged for enabling a second bypass path for bypassing a second part of the filament circuit, wherein the at least one circuit element is connected in parallel to a first of the two resistors and the first part of the filament circuit is the first of the two resistors, and the second circuit element is connected in parallel to a second of the two resistors and the second part of the filament circuit is the second of the two resistors.

4. A retrofit LED tube according to claim 1, wherein the filament enhancement circuit further comprises a shunt resistor connected in series with the at least one circuit element.

5. A retrofit LED tube according to claim 1, wherein the at least one circuit element is a switch.

6. A retrofit LED tube according to claim 1, wherein the filament enhancement circuit is arranged to determine that the lamp recognition phase is completed by any of:
    detecting the lamp current flowing to the LED array and determining whether the lamp current exceeds a predetermined lamp current threshold;
    determining that a predefined amount of time has lapsed since the supply voltage was received.

7. A lighting system comprising:
    a high frequency electronic ballast; and a retrofit LED tube according to claim 1;
wherein the retrofit LED tube is connected to the high frequency electronic ballast.

8. A method of operating a retrofit LED tube connected to an electronic ballast, the retrofit LED tube comprising an LED array, an LED driver for driving the LED array, a filament circuit configured to carry a filament current circulating back to the electronic ballast for enabling lamp recognition by the electronic ballast during a lamp recognition phase, and a filament enhancement circuit comprising at least one circuit element arranged for enabling a bypass path for bypassing at least a first part of the filament circuit, the method comprising the steps of:
determining, by the filament enhancement circuit, that the lamp recognition phase has completed; and
reducing, by the filament enhancement circuit, the power consumed in the filament circuit in reply to the determination that the lamp recognition phase is completed.

9. A method of operating a retrofit LED tube according to claim 8, wherein the step of reducing the power consumed in the filament circuit comprises:
activating, by a controller arranged for controlling the at least one circuit element after, the at least one circuit element after the lamp recognition phase.

10. A method of operating a retrofit LED tube according to claim 8, the method further comprising the step of determining that the lamp recognition phase is completed by any of:
detecting, by the filament enhancement circuit, a lamp current flowing to the LED array and determining whether the lamp current exceeds a predetermined lamp current threshold;
determining, by the filament enhancement circuit, that a predefined amount of time has lapsed since a supply voltage was received by the LED driver.

11. A retrofit LED tube according to claim 5, wherein the switch is a metal oxide semiconductor field effect transistor (MOSFET).

12. A retrofit LED tube according to claim 1, wherein the at least one circuit element is a negative temperature coefficient (NTC) thermistor.

13. A retrofit LED tube according to claim 1, wherein the LED driver is an alternating current (AC) LED driver, and the supply voltage is an AC supply voltage.

* * * * *